(12) United States Patent
Vaz De Azevedo et al.

(10) Patent No.: US 6,548,837 B1
(45) Date of Patent: Apr. 15, 2003

(54) SOLENOID BLEED VALVE FOR A DEVICE FOR THE DISPOSAL OF VAPOURS

(75) Inventors: José Vaz De Azevedo, Saint Vincent (FR); Lucien Donce, Magny-en-Vexin (FR)

(73) Assignee: Johnson Controls Automotive Electronics (FR)

(*) Notice: Subject to any disclaimer, the term of this patent is extended or adjusted under 35 U.S.C. 154(b) by 0 days.

(21) Appl. No.: 09/980,827

(22) PCT Filed: Jun. 7, 2000

(86) PCT No.: PCT/FR00/01561
§ 371 (c)(1),
(2), (4) Date: Dec. 7, 2001

(87) PCT Pub. No.: WO00/75502
PCT Pub. Date: Dec. 14, 2000

(30) Foreign Application Priority Data

Jun. 8, 1999 (FR) .......................................... 99 07174

(51) Int. Cl.$^7$ .............................................. F16K 31/02
(52) U.S. Cl. .................................. 257/129.21; 123/520
(58) Field of Search .................. 257/129.21, 129.15; 123/520

(56) References Cited

U.S. PATENT DOCUMENTS

| | | | | |
|---|---|---|---|---|
| 4,763,635 A | * | 8/1988 | Ballhause et al. .......... | 123/520 |
| 4,986,246 A | * | 1/1991 | Kessler de Vivie et al. | 123/520 |
| 5,178,116 A | * | 1/1993 | Fehrenbach et al. ... | 251/129.21 |
| 5,560,585 A | * | 10/1996 | Krimmer et al. ....... | 251/129.21 |
| 5,630,403 A | * | 5/1997 | Van Kampen et al. ...... | 123/520 |
| 5,809,977 A | * | 9/1998 | Krimmer et al. ........... | 123/516 |
| 6,149,126 A | * | 11/2000 | Krimmer et al. ....... | 251/129.21 |

* cited by examiner

*Primary Examiner*—Henry C. Yuen
*Assistant Examiner*—John Bastianelli
(74) *Attorney, Agent, or Firm*—Foley & Lardner

(57) ABSTRACT

A solenoid purge valve for a device for removing vapor, the valve having: a case (1, 2) with vapor inlet and outlet orifices (3, 4); an electromagnet coil (6) mounted in the case; a magnetic armature (21) situated facing one end of the magnetic core (11) of the coil (6) and movable axially between two positions; a valve seat (20) mounted in leak-tight relationship with the outlet orifice (4) of the case; and a closing valve member (25) secured to the moving armature (21), the valve member (25) being pressed against its seat (20) and spaced apart therefrom respectively when the moving metal armature (21) is in each of its two positions; the seat (20) is supported by the coil (6) and has a tubular extension (17) secured thereto and engaged coaxially in the outlet orifice (4), possessing a smaller diameter, an O-ring (19) being interposed radially between the tubular extension (17) and the outlet orifice (4), whereby the valve member and its seat are highly decoupled from the case from the point of view of vibration.

9 Claims, 1 Drawing Sheet

SOLENOID BLEED VALVE FOR A DEVICE FOR THE DISPOSAL OF VAPOURS

Figure 1:
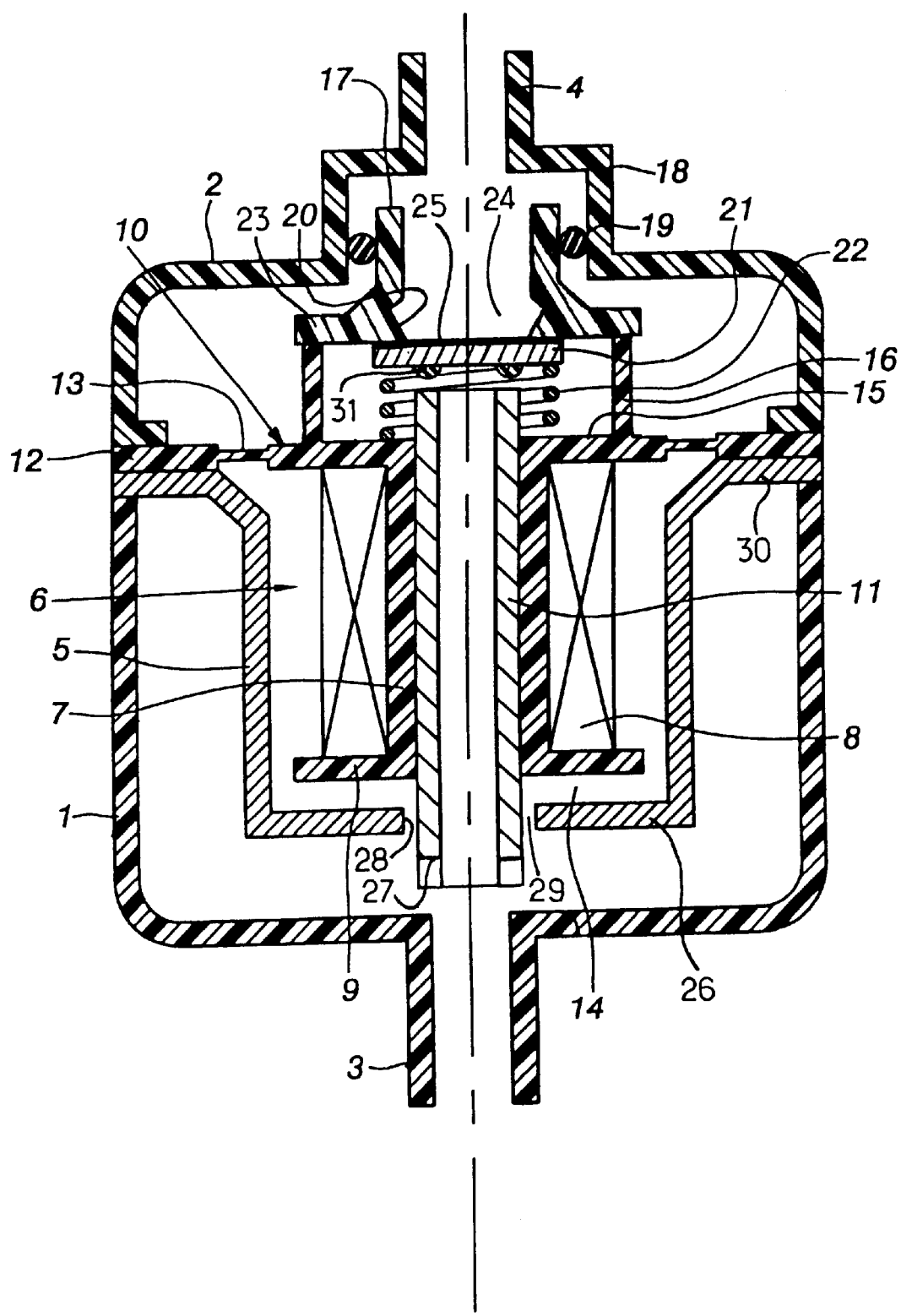

The present invention relates to improvements to solenoid purge valves for vapor removal devices, where such a valve comprises:

a case provided with a vapor inlet orifice and with a vapor outlet orifice;

an electromagnet coil mounted in said case;

a metal armature of magnetic material situated facing one end of a magnetic core of said electromagnet coil and movable axially between a first position under drive from a return spring in the absence of electromagnet excitation, and a second position under the action of the excited electromagnet, against the return spring;

a valve seat mounted in leaktight relationship with the above-mentioned outlet orifice of the case; and a closing valve member secured to the above-mentioned moving metal armature, the valve member being pressed against its seat and moved away therefrom when the moving metal armature is respectively in its first position and in its second position.

A preferred although non-exclusive application of such valves lies in devices for recovering the gasoline vapor that accumulates in gasoline tanks, above the liquid phase, and are intended to accompany a controlled-ignition engine, in particular in a motor vehicle, in order to avoid exhausting said vapor directly into the atmosphere.

A valve of the above type is known in which the valve seat is provided directly on the case, in conjunction with said vapor outlet orifice.

Such a valve is being mass-produced at present and is being installed in motor vehicles. That valve gives satisfaction in terms of operation and effectiveness.

However, it suffers from the drawback of being noisy while it is in operation and the noise it makes can disturb the people occupying the vehicle, particularly since modern vehicles generate greatly reduced amounts of background noise while they are in operation.

The noise generated by the solenoid valve is due essentially to the impacts of the moving armature being projected violently against the seat and the core under the control of the electromagnet which is excited by current pulses, e.g. at a frequency of about 10 Hz. These axial impacts are communicated to the case via the seat which is secured thereto and via the coil which is supported by the case. Under the action of these impacts, the case forms a sounding board and transmits the vibration to the environment both through the air and by solid conduction (via the support for the valve case on the vehicle structure).

In spite of it being possible to use a floating mount, vehicle manufacturers also require individual devices to be made quieter so that each device contributes to obtaining as low as possible a noise level in the vehicle cabin.

It is therefore necessary for the solenoid valve itself to be redesigned and improved in order to reduce significantly the vibration of its case, and thus the noise delivered to the environment.

To this end, a solenoid purge valve as mentioned in the introduction is characterized, when embodying the invention, in that said valve seat is supported by the electromagnet coil and has a tubular extension secured thereto which is engaged coaxially in the outlet orifice provided in the case, and which possesses a diameter that is smaller than that of the orifice, an O-ring being interposed radially between said tubular extension and said outlet orifice.

By means of this arrangement, the impacts generated by the moving armature coming into abutment remain concentrated on the coil to which the valve seat has been secured. Furthermore, leaktight contact between the Oring and both the tubular extension of the valve seat on one side and the outlet orifice on the other side takes place in a direction that is strictly radial, whereas said moving armature comes into abutment in a direction that is axial: the impact that results from this abutment is essentially an axial impact with a transverse (or radial) component that is very small or even zero.

From the point of view of propagating vibration, this provides good decoupling between the case of the valve and the coil with the valve seat secured thereto. This greatly attenuates propagation of the operating noise of the solenoid valve from the case through the air and/or by solid conduction.

In a preferred embodiment, the electromagnet coil comprises:

a hub having two endplates;

an electrical winding mounted coaxially around the hub;

a magnetic core fixed coaxially inside the hub; and a magnetic circuit surrounding said hub and winding and supported by a first endplate of the hub situated beside said seat;

and the seat is supported by said first endplate of the hub. Under such circumstances, it is advantageous for said first endplate to be provided with a multiplicity of projecting fingers and for the seat to be formed in an strike plate attached to said projecting fingers which can then be implemented so as to be fine in shape. It is also possible to envisage the above-mentioned tubular extension being a projecting portion of the strike plate which surrounds the opening defined at the center of the seat and which extends away therefrom.

In a specific embodiment, the first endplate of the hub has a peripheral support collar in the case, said collar possibly being discontinuous and presenting two diametrically-opposite collar segments. By means of such an arrangement, the electromagnet coil is made easier to install in the case, it is possible to provide keying against wrong installation, and the amount of contact between the coil and the case that supports it is reduced, thereby impeding the transmission of vibration to the case.

In this arrangement, it is also possible to envisage providing for the peripheral collar to be attached to the hub via a plurality of generally radial spokes, with each spoke being, at least in part, thinner than the collar and the hub, so that the thin spokes provide the coil with resilient suspension relative to the case and filter vibration between the electromagnet coil and the case.

It is also possible to envisage the magnetic circuit being generally U-shaped with radial outside fins at the top, which radial fins are secured to said collar, with the end wall of the magnetic circuit being pierced by an opening through which the corresponding end of the magnetic core passes without making contact: this avoids physical contact between the end wall of the magnetic circuit and the magnetic core which is subjected to the abutment impacts of the moving armature, thus likewise reducing the propagation of vibration from the core to the case via the magnetic circuit.

In addition, and still to the same purpose, it is also possible to provide for the end wall of the magnetic circuit to be axially offset from the second endplate of the electromagnet coil so that the vibration of the electromagnet coil is not significantly transmitted to the magnetic circuit via this route.

In a concrete embodiment, the moving metal armature is a small plate having a layer of sealing material secured to one face thereof, thereby constituting the leaktight valve member proper.

Also preferably, the other face of the small plate constituting the moving armature is provided with damping means such as a ring or angularly-disposed studs situated facing the front end of the magnetic core to damp the impact of the moving armature contacting the core.

Advantageously, the magnetic core can be moved axially within the hub for the purpose of adjusting the air gap between the moving metal piece and the facing end of the core.

A solenoid purge valve combining all of the dispositions explained above, or at least most of them, presents effective decoupling of vibration between the vibrating portion and the case, and in the above-mentioned example of application in the motor industry to removing gasoline vapors, a solenoid valve is provided which no longer generates any operating noise that is perceptible within the vehicle.

The invention will be better understood on reading the following detailed description of a particular embodiment, which is a preferred embodiment and which is given by way of non-limiting example. In the description, reference is made to the accompanying drawing in which the sole figure is a side view in section of said preferred embodiment in a configuration corresponding to a solenoid purge valve for removing gasoline vapor from a motor vehicle fuel tank.

The solenoid purge valve shown in the figure comprises a case, in particular one made of rigid plastics material, forming a bottom case body 1 and a top case body or cover 2. The bottom case body 1 forms a bowl whose bottom presents an inlet orifice 3 (extended by an inlet duct) for admitting vapor, and the top case body or cover 2 is provided with a vapor outlet orifice 4 (extended by an outlet duct).

A circuit 5 of magnetic material is disposed in the bowl 1 and surrounds an electromagnet coil 6, in particular by being folded into a generally U-shape.

The coil 6 comprises a hub 7 of molded plastics material integral with a first or top endplate 10 and a second or bottom endplate 9. A generally rod-shaped tubular magnetic core 11 is disposed inside the hub 7. An electrical winding 8 is mounted in a fixed position on the hub of the coil.

The top endplate 10 comprises three successive radial portions. The radially outer portion forms a collar 12 which is used for fixing the coil 6 in the case and which, for this purpose, is pinched between the bottom case body 1 and the top case body 2. The peripheral collar 12 can be continuous, but in order to make overall design of the valve easier (and in particular in order to leave room for electrical connection terminals for the winding 8 and to enable a keying arrangement to be provided to ensure properly oriented assembly), the collar 12 is discontinuous and presents two diametrically-opposite collar segments.

The radially middle portion is constituted by spokes 13 of smaller thickness (thin spokes) so as to form a discontinuous membrane that is elastically deformable in the axial direction, allowing the coil 6 to move axially by a relatively small amount relative to the case.

The radially inner portion 15 of the top endplate 10 is another thick portion and co-operates with the bottom endplate 9 to hold the winding 8 in place.

A support member 16 advantageously in the form of a plurality of preferably-thin fingers projecting vertically from the top endplate 10 supports a strike plate 23 which is provided with an axial opening 24 and which comprises, going vertically upwards: a tubular extension 17 engaged coaxially inside a tubular portion 18 lying under the outlet orifice 4 of the top case body 2. An O-ring 19 is placed between the outside surface of the tubular portion 17 and the inside surface of the tubular portion 18 to isolate the inside of the valve from the outlet orifice 4. It is emphasized at this point that the O-ring 19 makes contact with the tubular portions 17 and 18 in a direction that extends radially only.

The bottom peripheral zone of the axial opening 24 is shaped to form a lip 20 which constitutes a valve seat.

Finally, a metal armature 21 in the form of a small plate of magnetic material is situated facing the top end of the magnetic circuit 11, between the magnetic circuit and the valve seat 20, and it is urged resiliently towards the seat 20 by a helical spring 22 disposed coaxially with the core 11. The moving armature 21 is secured to a closing valve member 25 suitable for cooperating in leaktight manner with said seat 20 to close the opening 24. In the simple embodiment shown in the single figure, the valve member 25 proper is constituted merely by a layer of sealing material placed on the top face of the moving armature 21.

When the winding 8 is unpowered (no current carried by the winding, electromagnet not excited), the spring 22 holds the valve member 21, 25 in contact with the seat 20. The valve is thus normally closed.

When the winding is powered electrically (typically by means of current pulses applied with a non-zero duty ratio), the valve member 21, 25 oscillates between a position in which it is in abutment against the seat 20 and an open position in which it comes into abutment against the end of the magnetic core 11. In this example of excitation by means of current pulses, the equivalent extent to which the valve is opened is proportional to the mean open duration of the valve member 25, and thus to the duty ratio of the current pulses.

The impact of the valve member 21, 25 striking the seat 20 causes the seat, and thus the coil 6, to move axially, which is made possible by the elasticity of the spokes 13.

Similarly, the impact of the valve member 21, 25 against the end of the magnetic core 11 causes the coil 6 to move axially in the opposite direction, which is likewise made possible by the elasticity of the spokes 13.

In all of these reciprocating axial movements of the coil 6, sealing between the moving coil and the fixed case is provided in all axial positions of the coil relative to the case by means of the radial position of the O-ring 19 between the coaxial portions 17 and 18.

Essentially, it will be observed above all that the impacts generated by the valve member 21, 25 coming into abutment alternately against the seat 20 and against the end of the core 11 are axial impacts. By using an O-ring 19 in the manner described above (radial positioning), there is no axial connection between the coil 6 and the case. As a result, given that the radial component of the impacts through the O-ring is very small or even zero, the configuration described provides extremely effective decoupling of vibration between the coil 6 and the case 1, 2.

Furthermore, because of the thin shape and radial extent of the spokes 13, they serve not only to provide relatively elastic connection between the coil 6 and the case 1, 2, but they also transmit a radial vibratory component that is very small or even zero.

Likewise, the layer of sealing material 25 constituting the valve member proper attenuates the impact of the armature 21 coming into abutment against the seat 23. Symmetrically, the other face of the armature 21 can be provided with damping means 31 (e.g. in the form of a ring or in the form of angularly distributed studs) situated facing the front end of the magnetic core 11 so as to damp impact on opening.

Finally, it is also possible to eliminate a vibration transmission path by ensuring that the U-shaped magnetic circuit 5 goes down below the coil 6: as a result the bottom end wall 26 of the magnetic circuit makes contact neither with the bottom endplate 9 of the coil (gap 14) nor with the bottom of the bottom case body 1.

In addition, in the configuration shown in the sole figure, the bottom end of the core 11 can project beyond the bottom end wall 26 of the magnetic circuit 5, and said end can be shaped so as to enable the core 11 to move axially relative to the hub 7 so as to allow the air gap between the moving structure 21 and the facing end of the core 11 to be adjusted. For this purpose, it is possible, for example, to make use of the means described in document FR-A-2 706 569: the outside surface of the core 11 is threaded (not shown in the figure) and embedded (e.g. by overmolding) in the plastics material constituting the hub 7; the bottom end of the core 11 is split diametrically at 27; a screwdriver can then turn the core which, because of the presence of the thread, then moves towards or away from the armature 21 depending on the direction in which it is turned.

In order to avoid any transmission of vibration between the core 11 and the magnetic circuit 5, the bottom end wall 6 in this configuration is pierced by an opening 28 of diameter significantly greater than that of the core so as to leave an annular gap 29.

To ensure that the vibration-isolating gaps 14 and 29 are maintained while nevertheless implementing a structure that is simple and easy to assemble, the following arrangement can be used. The generally U-shaped magnetic circuit 5 has two branches which terminate on top in the form of fins 30 that project radially outwards. These fins 30 are secured (e.g. by adhesive) to the above-mentioned collar 12, and in particular to the segments of a discontinuous collar as envisaged more particularly. The electromagnet coil 6 and the circuit 5 thus form a unitary assembly which is firstly easy to install in the case 1, 2 during assembly, and which is secondly arranged in such a manner that its component parts are accurately positioned relative to one another, and in particular with the gap 29 being maintained.

Combining the above dispositions within a solenoid purge valve as shown in the accompanying figure leads to a considerable reduction in vibration of the case 1, 2, and as a result to a significant decrease in the amount of noise that is generated, in particular in a motor vehicle, by the operation of the solenoid purge valve; in practice, the operating solenoid purge valve becomes less noisy within the vehicle.

What is claimed is:

1. A solenoid purge valve for a vapor removal device, for a device for recovering gasoline vapor present in a fuel tank for a controlled-ignition engine, said valve comprising:

a case provided with a vapor inlet orifice and with a vapor outlet orifice;

an electromagnet coil mounted in said case;

a metal armature of magnetic material situated facing one end of a magnetic core of said electromagnet coil and movable axially between a first position under drive from a return spring in the absence of electromagnet excitation and a second position under the action of the excited electromagnet, against the return spring;

a valve seat which is mounted in leaktight relationship with said outlet orifice of the case and which is secured to a tubular extension engaged coaxially in the outlet orifice provided in the case and having a diameter smaller than that of the outlet orifice, an O-ring being interposed radially between said tubular extension and side outlet orifice; and a closing valve member secured to said moving metal armature, the valve member resting against its seat or being moved away therefrom when the moving metal armature is respectively in its first position or in its second position;

characterized in that the electromagnet coil comprises:

a hub having two endplates;

an electrical winding mounted coaxially around the hub;

a magnetic core fixed coaxially inside the hub; and a magnetic circuit which surrounds said hub and winding and which is supported by a first endplate of the hub situated beside said seat;

in that said first endplate of the hub has a peripheral support collar in the case said peripheral collar being connected to the hub by a plurality of spokes extending generally radially, and each spoke being, at least in part, thin relative to the collar and to the hub, whereby the thin spokes provide the coil with resilient suspension relative to the case and filter vibration between the electromagnet coil and the case;

and in that the valve seat is supported by said first endplate of the hub, whereby the closing valve member and its seat are at least highly decoupled from the case, from the point of view of vibration.

2. A valve according to claim 1, characterized in that said first endplate is provided with a multiplicity of projecting fingers and in that the seat is formed in a strike plate attached to said projecting fingers.

3. A valve according to claim 2, characterized in that said tubular extension is a projecting portion of the strike plate which surrounds the opening defined in the center of the seat and which extends away therefrom.

4. A valve according to claim 1, characterized in that the peripheral collar is discontinuous and has two diametrically-opposite collar segments.

5. A valve according to claim 1, characterized in that the magnetic circuit is generally U-shaped with radial outside fins at the top, in that the radial fins are secured to said collar, and in that the bottom end wall of the magnetic circuit is pierced by an opening through which the end of the magnetic core passes without contact.

6. A valve according to claim 5, characterized in that the bottom end wall of the magnetic circuit is axially offset from the second endplate of the hub of the electromagnet coil, whereby vibration of the electromagnet coil is not transmitted significantly to the magnetic circuit.

7. A valve according to claim 1, characterized in that the moving metal armature is a small plate having a layer of sealing material secured to one face thereof to constitute the sealing valve member proper.

8. A valve according to claim 7, characterized in that the other face of the small plate is provided with damper means placed facing the front end of the core to damp the impact of the moving armature against the core.

9. A valve according to claim 1, characterized in that magnetic core can be moved axially inside the hub in order to adjust the air gap relative to the moving metal armature.

* * * * *